United States Patent
Quarendon et al.

(10) Patent No.: US 6,912,503 B1
(45) Date of Patent: Jun. 28, 2005

(54) MULTISTAGE DATA PURCHASE WITH MOBILE INFORMATION ORDERING AND DOCKING STATION RECEIPT

(75) Inventors: Brian L. Quarendon, Hampshire (GB); Steven N. Terranova, Cary, NC (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 09/483,074

(22) Filed: Jan. 14, 2000

(51) Int. Cl.[7] .............................................. G06F 17/60
(52) U.S. Cl. .................................................. 705/1
(58) Field of Search ............................. 705/1, 26, 27; 235/384; 455/428

(56) References Cited

U.S. PATENT DOCUMENTS

| | | |
|---|---|---|
| 4,804,937 A | 2/1989 | Barbiaux et al. |
| 5,072,380 A | 12/1991 | Randelman et al. |
| 5,204,819 A | 4/1993 | Ryan |
| 5,238,034 A | 8/1993 | Corfitsen |
| 5,327,066 A | 7/1994 | Smith |
| 5,359,522 A | 10/1994 | Ryan |
| 5,422,624 A | 6/1995 | Smith |
| 5,499,181 A | 3/1996 | Smith |
| 5,546,523 A | 8/1996 | Gatto ........................ 395/156 |
| 5,636,276 A | 6/1997 | Brugger |
| 5,717,374 A | 2/1998 | Smith |
| 5,742,229 A | 4/1998 | Smith |
| 5,790,423 A | 8/1998 | Lau et al. |
| 5,806,018 A | 9/1998 | Smith et al. |
| 5,822,216 A | 10/1998 | Satchell et al. |
| 5,859,416 A | 1/1999 | Gatto ........................ 235/384 |
| 5,877,698 A | 3/1999 | Kusnier et al. |
| 5,890,520 A | 4/1999 | Johnson, Jr. |
| 5,894,119 A | 4/1999 | Tognazzini |
| 5,907,793 A * | 5/1999 | Reams ........................ 455/3.1 |
| 5,913,180 A | 6/1999 | Ryan |
| 5,914,654 A | 6/1999 | Smith |
| 5,931,901 A | 8/1999 | Wolfe et al. |
| 5,956,259 A | 9/1999 | Hartsell, Jr. et al. |
| 5,959,945 A | 9/1999 | Kleiman |
| 5,980,090 A | 11/1999 | Royal, Jr. et al. |
| 5,986,200 A | 11/1999 | Curtin |
| 5,987,381 A | 11/1999 | Oshizawa |
| 5,995,898 A | 11/1999 | Tuttle |
| 6,018,293 A | 1/2000 | Smith |
| 6,026,375 A | 2/2000 | Hall et al. ..................... 705/26 |
| 6,052,629 A | 4/2000 | Leatherman et al. |
| 6,070,156 A | 5/2000 | Hartsell, Jr. |
| 6,149,055 A | 11/2000 | Gatto ......................... 235/379 |
| 6,422,464 B1 * | 7/2002 | Terranova ................... 235/384 |

FOREIGN PATENT DOCUMENTS

| | | |
|---|---|---|
| GB | 2332772 | 6/1999 |
| WO | WO 99/09499 | 2/1999 |
| WO | WO 99/16700 | 4/1999 |
| WO | WO 99/30257 | 6/1999 |
| WO | WO 00/00972 | 1/2000 |

OTHER PUBLICATIONS

Abbott, John; Dispensing Information; Convenience Store news, v36, n12, p117; dialog copy pp. 1–5.*

* cited by examiner

Primary Examiner—Thomas A. Dixon
(74) Attorney, Agent, or Firm—Withrow & Terranova, PLLC (57) ABSTRACT

A multistage information purchasing system comprises a vehicle onboard computer configured to arrange for the purchase of information through a wireless communications network. The vendor from whom the information has been purchased indicates a proximate docking station from which the purchased information is available and the vehicle is directed to that docking station. At the docking station, the consumer downloads the purchased information to the onboard computer for later manipulation or use. Alternatively, the consumer may abort the transaction if it is inconvenient to travel to the docking station.

22 Claims, 7 Drawing Sheets

MULTISTAGE DATA PURCHASE WITH MOBILE INFORMATION ORDERING AND DOCKING STATION RECEIPT

RELATED APPLICATIONS

The present application is related to concurrently filed, commonly invented, commonly assigned application Ser. No. 09/483,281, entitled MULTISTAGE FORECOURT DATA ORDER AND/OR PURCHASE and Ser. No. 09/483,079, entitled RETAILING AUDIO FILES IN A FUEL DISPENSING ENVIRONMENT, both of which are hereby incorporated by reference.

BACKGROUND OF THE INVENTION

1. Field of the Invention

The present invention relates to a system and method enabling consumers to purchase information from their vehicle while traveling and subsequently retrieving the information so purchased at a docking station such as a fueling environment.

2. Description of the Prior Art

Humans are naturally cursed with finite information gathering senses. Without omniscience, humans must rely on secondary sources for much of the information on which they make daily decisions. The ability to access information on which these decisions are made is an ever evolving process. While the Information Age has made available vast quantities of information in today's society, there is no guarantee that an individual has access to any of this information. However, advances in information gathering are keeping individuals abreast of and on top of the enormous amounts of information available.

Initially, radio and television helped keep individuals abreast of current events and other desired information. Telephones let people stay in touch so that people could stay on top of different sorts of information, like family news and other random gossip. More recently, networked computers have created and provided the Internet, and more specifically, the World Wide Web, with its myriad information sources. Networked computers have also allowed people to purchase items or information such as hotel reservations, airline tickets and the like from the convenience of their home or office computer.

However, networked computers have suffered from the fact that they must have a phone line or equivalent physical link to access the desired information. While cellular phones, wireless modems, and other wireless devices are proliferating and seemingly eliminating the need for the physical link, presently bandwidth limitations preclude such devices from being truly effective information gathering devices. That is, downloading a large quantity of information requires an extended amount of time, and since most cellular customers pay for each minute, the cost associated with these lengthy downloads rapidly becomes prohibitive. Higher bandwidth through cellular service, if available, is also more expensive, although the transmission times may be reduced.

In an effort to help promote the convergence of information gathering devices, Marconi Commerce Systems Inc., assignee of the present invention, has provided, in U.S. patent application Ser. No. 08/896,988, now U.S. Pat. No. 6,052,629 which is herein incorporated by reference, an Internet capable fuel dispenser allowing consumers to remain connected to the Internet even during the mundane task of fueling their vehicle. Additionally, a family of patents to Smith exists, such as U.S. Pat. Nos. 5,914,654 and 5,806,018, which are incorporated by reference, that teaches techniques of allowing consumers to purchase information through a fuel dispenser. Specifically, Smith contemplates the existence of effective onboard computers that may receive information through the fuel dispensers for manipulation by the consumer from within the vehicle. However, Smith teaches that the information may be purchased only at the fuel dispenser and delivered therefrom. This requires that the consumer select, purchase, and receive the information during a single visit to the fueling environment. This may result in inefficient use of time at the fueling environment. Furthermore, the type of information available for purchase is limited by the resources available to the fuel dispenser. That is, if the fuel dispenser only has access to certain resources, the consumer may only purchase information from those certain resources. If the consumer desires information from another source, she is out of luck.

Thus, the problem exists that information cannot be purchased from a source such as a vehicle and delivered at another separate location or area.

SUMMARY

The present invention assists information consumers in purchasing desired information while promoting the efficient use of the consumers' time during the transaction. Specifically, a consumer may locate desired information and purchase the information through an onboard computer over a wireless network. However, to conserve bandwidth on the wireless network, the consumer is directed to the closest docking station at which the consumer may download or access the information. This may be coupled with detailed instructions on how to reach the closest docking station such as may be accomplished with onboard navigation aids.

Additionally, if the consumer decides that it is too inconvenient to reach the designated docking station, the consumer may abort the transaction and receive a refund or credit to the financial account from which the purchase was authorized. In a preferred embodiment, the docking station is a fueling environment that the consumer may be inclined to visit independently of the information transaction. This convergence of desires may prompt the consumer to choose a fueling environment with a docking station over a fueling station without a docking station to receive the purchased information. In this manner, fueling environments and their forecourt devices that act as docking stations may have a competitive edge over fueling environments that do not so act. Alternate docking stations may be travel rest areas, roadside kiosks, or the like.

DETAILED DESCRIPTION OF THE PREFERRED EMBODIMENTS

The present invention is adapted to provide a method to vend information to a consumer's onboard computer for later consumption. Specifically, the transaction surrounding the transfer of information is a multistage transaction. However, to achieve this end, the consumer requires a vehicle with an onboard computer having an input device, an output device, and the ability to transfer information to the onboard computer. The particular type of information vended includes, but is not limited to: hotel reservations, stock quotes, airline reservations, travel conditions, weather information, and the like.

Figure 1:
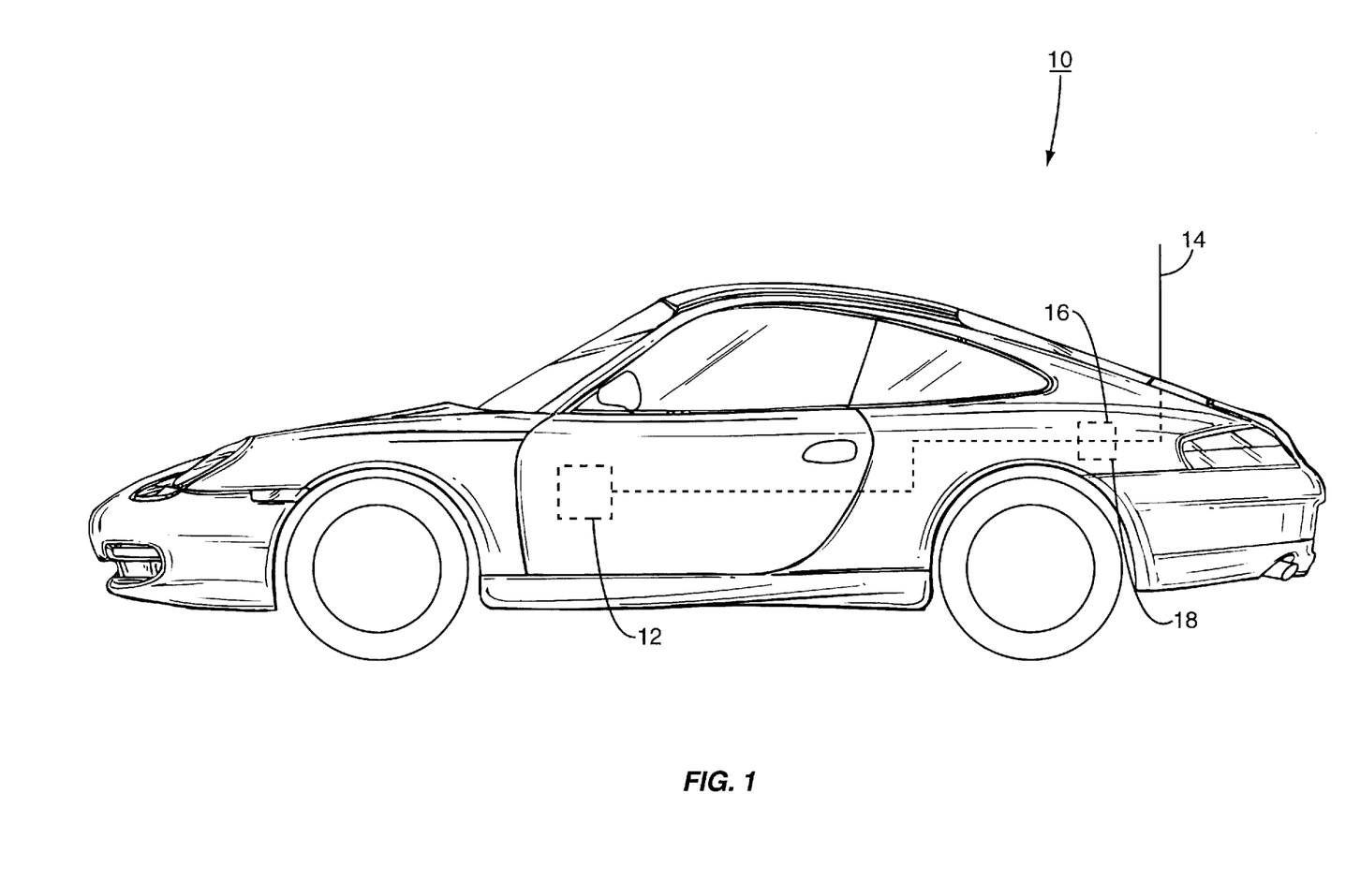
FIG. 1 is a side elevational view of a vehicle incorporating an onboard computer as may be used in the present invention.

Turning now to the drawings, FIG. 1 shows a vehicle 10 equipped with an onboard computer 12, an antenna 14, and a receiver 16. The onboard computer 12 is operatively connected to the receiver 16. Additionally, a transmitter 18 may be operatively connected to both the onboard computer 12 and the antenna 14.

Figure 2:
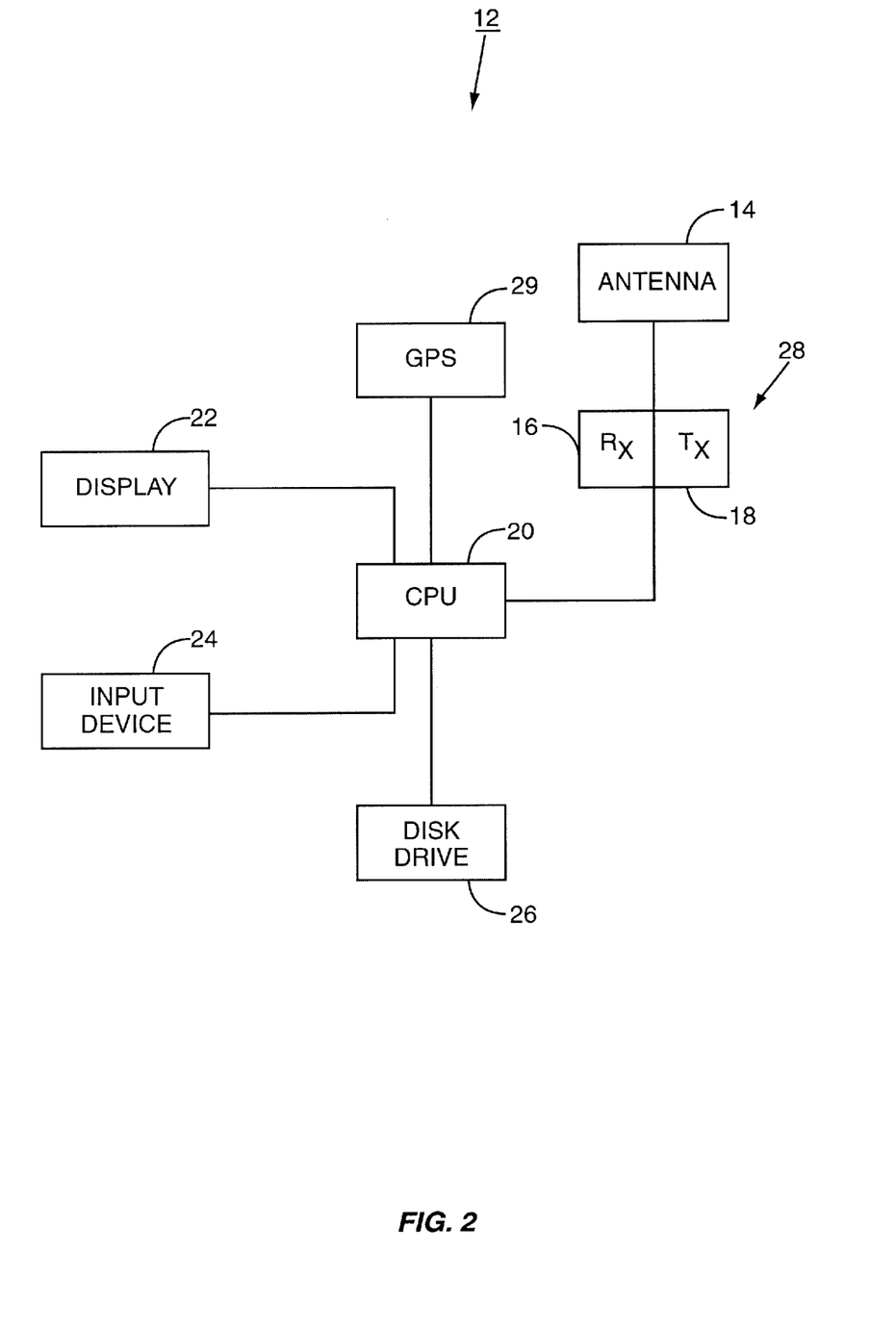
FIG. 2 is a block diagram illustrating the onboard computer of FIG. 1.

As seen in FIG. 2, the onboard computer 12 includes a central processing unit 20, which in turn is operatively connected to a display 22, an input device 24, a disk drive 26, and a transceiver 28, which includes both the receiver 16 and the transmitter 18. Display 22 may be a conventional video display such as is commonly found on laptop computers or it may be integrated with the input device 24 as a touchscreen or the like. Input device 24 may be a mouse, a keyboard, a joystick, or other well known input device as needed or desired. Disk drive 26 may be any sort of drive, which accepts a portable storage medium and reads data therefrom. Thus, floppy drives, CD-ROM drives, optical drives, and the like are all within the scope of the term "disk drive." The transceiver 28 may operate in the electromagnetic spectrum, preferably in the RF range, and may operate as a cellular communications device, a conventional radio receiver, or other device as needed or desired. Additionally, the computer 12 may include a Global Positioning System (GPS) locator 29. This may be integrated with computer 12 or merely communicatively connected thereto as needed or desired.

It should be appreciated that the onboard computer 12 may be positioned in any number of places within the vehicle 10, and may be dispersed or integrated into a single housing as needed or desired. For example, the display 22 and the input device 24 could be positioned in the steering wheel, with the CPU 20 positioned in the trunk of the vehicle; or the entire computer 12 could be positioned on the passenger side dashboard. Onboard computer 12 may be a separate unit in the vehicle 10, or it may be integrated into a vehicle component such as a radio. Additionally, the onboard computer 12 may be a laptop computer that has a hook up station within the vehicle 10, much like cellular phones have in-vehicle hands free stations. Other placements are possible and within the scope of the present invention.

Figure 3:
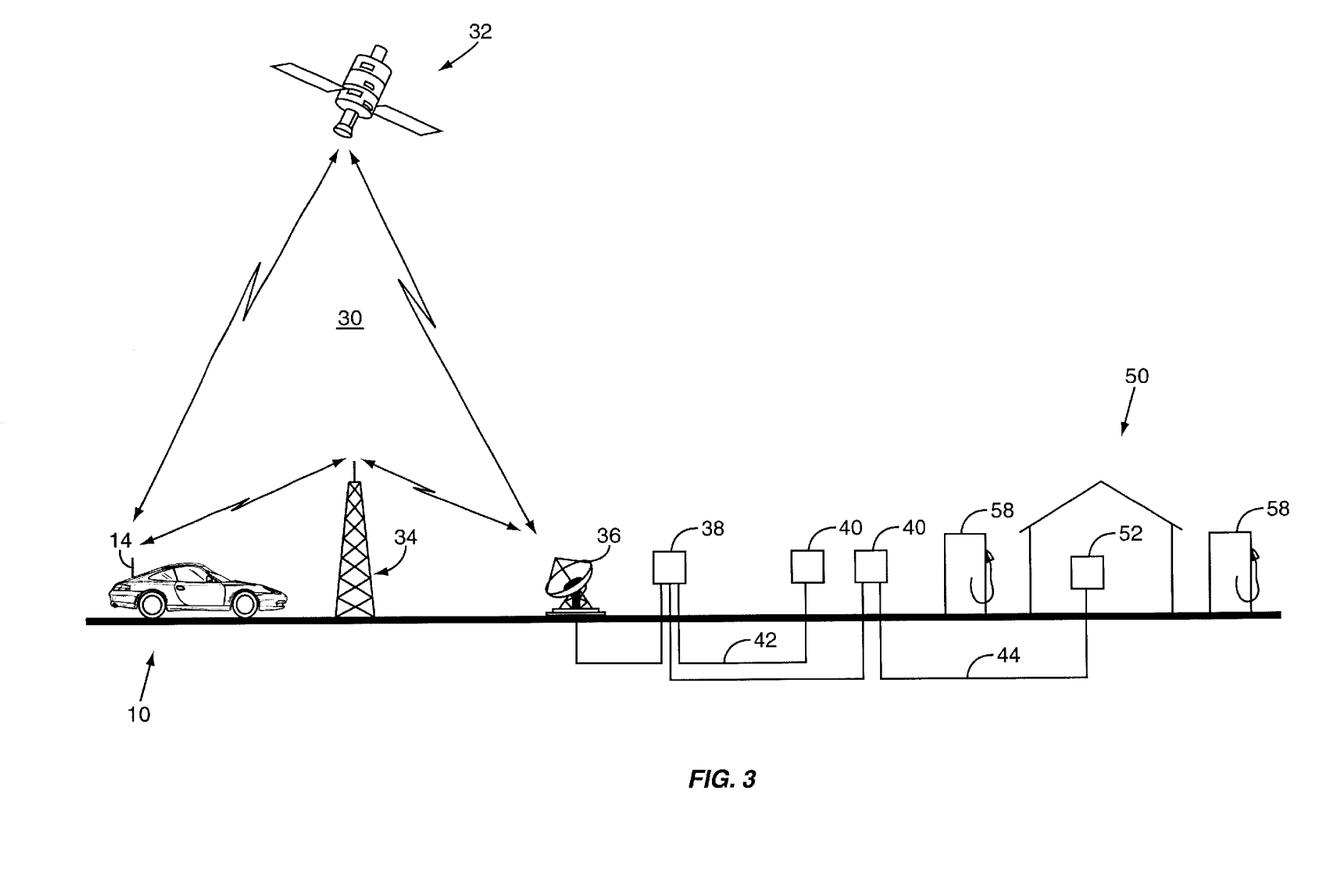
FIG. 3 is a schematic depiction of the communications network adapted to support the present invention.

Equipped with such an onboard computer 12, a consumer may purchase information pursuant the present invention as better shown in FIG. 3. Specifically, the consumer may use the onboard computer 12 to send an information purchase request through the antenna 14 into a wireless network 30. Wireless network 30 may be a conventional cellular network or a satellite based network or some hybrid thereof and preferably includes a satellite 32 and a base station 34 which act as relays for communications from the vehicle 10 to a network host antenna 36. Network host antenna 36 is operatively connected to a network computer 38 that communicates with remote information providing computers 40 over a land based network 42. Network computer 38 manages the network 30 and may be a MSC or the like with a Home Location Register (HLR), a Vehicle Location Register (VLR) and other supporting attributes as are well understood in the wireless communication industry. While indicated as a land based network 42, it is possible that the network 42 be wireless. However, given the information transfer rates desired, and the present limitations on wireless communications, such is not desired.

Remote information providing computers 40 are connected over a second land based network 44 to a docking station 50 from which the consumer may receive information. Networks 42 and 44 may be part of the Internet, a proprietary network, or the like as needed or desired. Docking station 50 includes a site controller 52, which may act as a local server and downloads information from the remote information providing computers 40, or alternatively acts as a conduit for information from the computers 40 to pass through.

Figure 4:
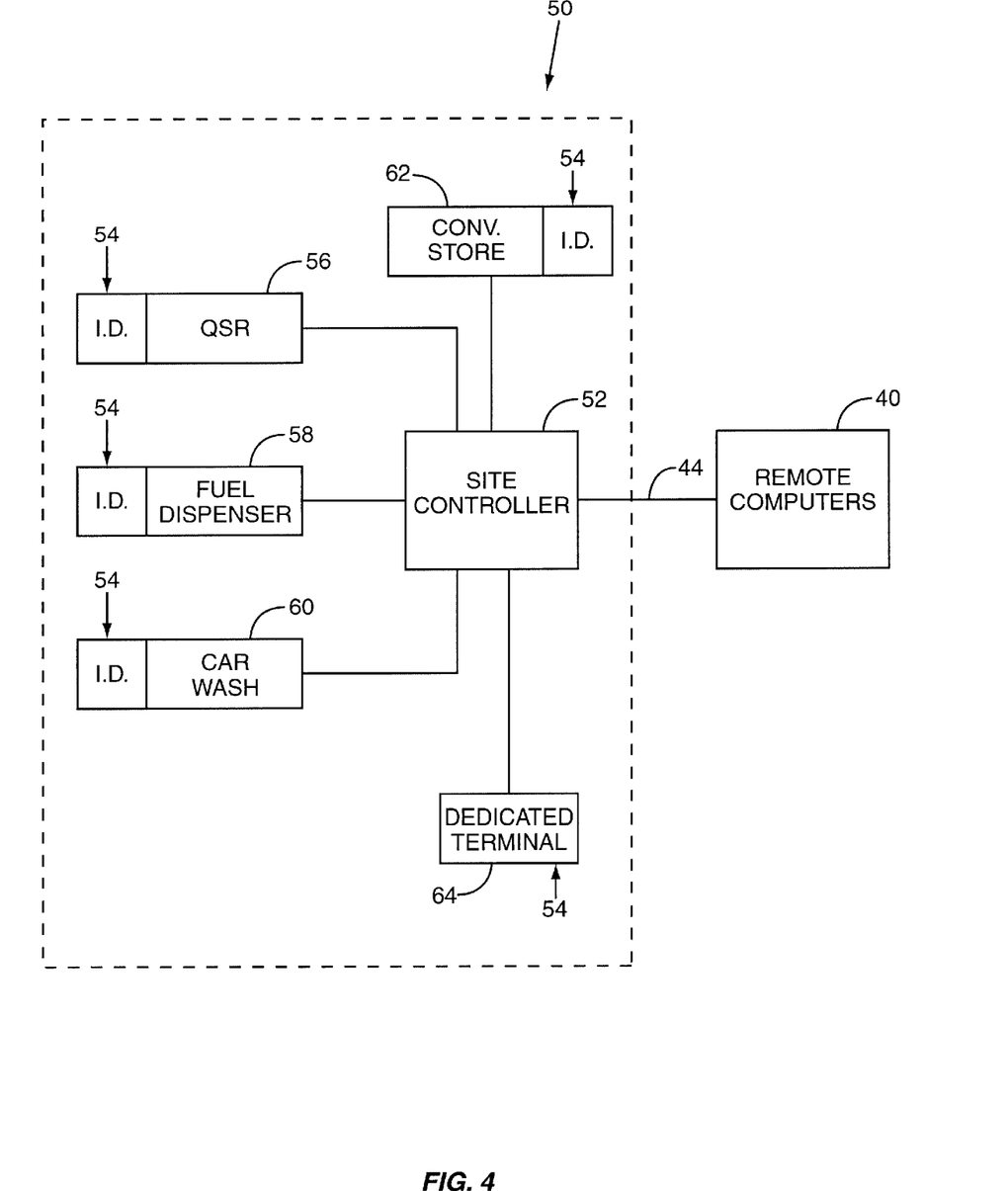
FIG. 4 is a block diagram of a preferred docking station as used in the present invention.

Docking station 50 is better understood through reference to FIG. 4. In the preferred embodiment, the docking station 50 is a fueling environment with multiple information dispensers 54 dispersed in the forecourt. While a fueling environment is preferred, other dedicated docking stations, roadside kiosks, or other vehicle accommodating retail establishments could work comparably. A full fueling environment 50 may include a Quick Serve Restaurant 56, one or more fuel dispensers 58, a car wash 60, a convenience store 62, and perhaps a dedicated information terminal 64. Each such element within the fueling environment 50 may include an information dispenser 54. Each information dispenser 54 may be communicatively coupled to the site controller 52 and through the site controller 52 to the remote information providing computers 40, such as through the network 44.

Figure 5:
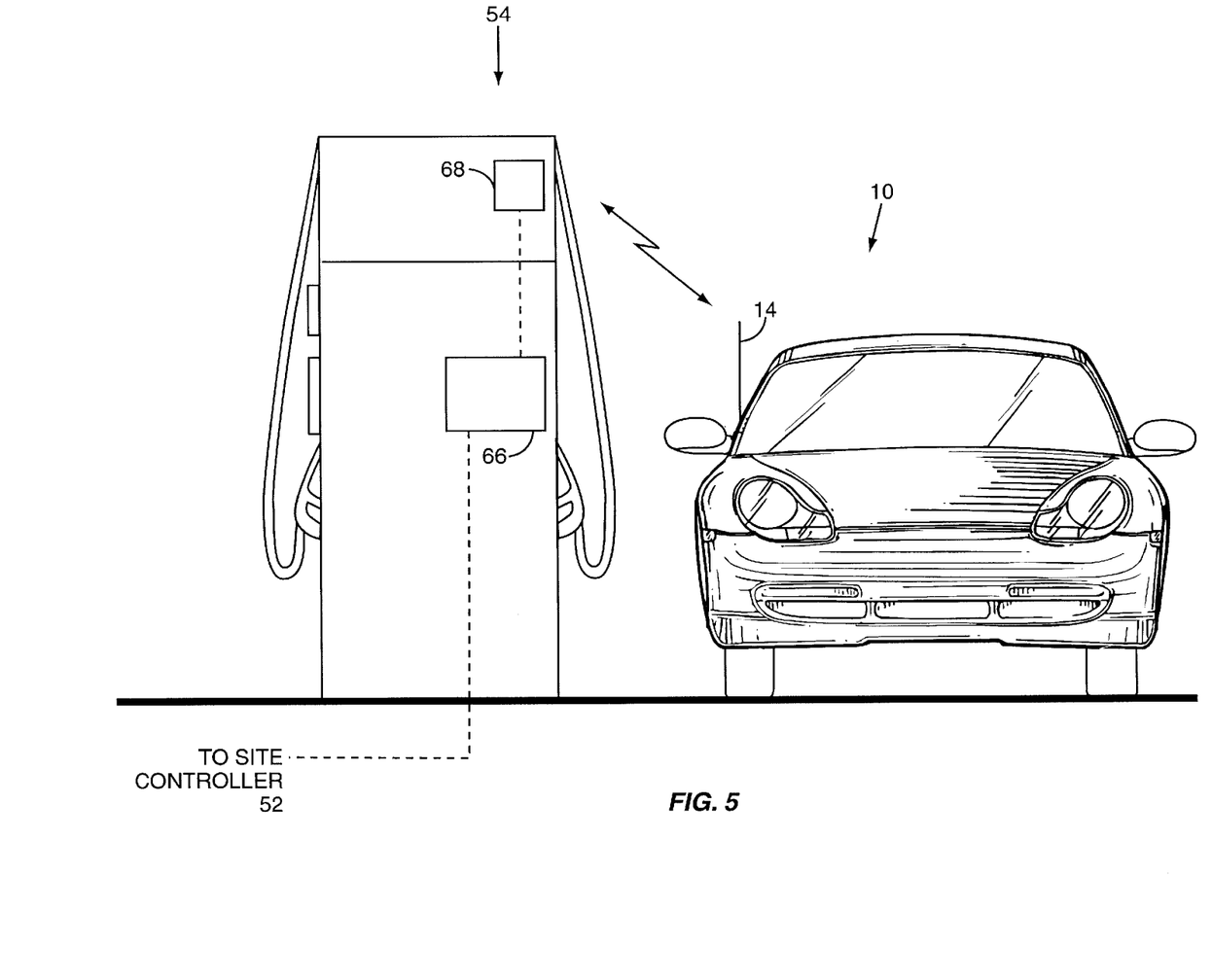
FIG. 5 shows the vehicle of FIG. 1 receiving information at a terminal in the docking station of FIG. 4.

As better seen in FIG. 5, an information dispenser 54 may include a control system 66 that communicates with the site controller 52 and operatively controls a transceiver 68. Transceiver 68 may not be a true transceiver, but includes at a minimum a transmitter adapted to communicate with the vehicle 10 through wireless communication received by the vehicle 10 through the antenna 14. This wireless communication, because it is at relatively short distances compared to the distances involved in network 30 may be much greater bandwidth communications links. With the greater bandwidth, transmission times are reduced and the consumer economizes the time spent downloading the information.

When the consumer, and vehicle 10, first arrive in the docking station 50, the vehicle 10 must identify itself to the information dispenser 54. To this end, the onboard computer 12 may perform a radio frequency "handshake" such as that disclosed in U.S. Pat. No. 5,956,259, which is hereby incorporated by reference. Transponders or the like may be used or other equivalent technologies, such as are used in automated fuel purchasing transactions.

As discussed in commonly invented application Ser. No. 09/483,281, entitled MULTISTAGE FORECOURT DATA ORDER AND/OR PURCHASE, previously incorporated by reference, the data transfer may be to an intermediate device, such as a portable playback device, a portable memory device or the like.

The communication links between the respective information dispensers 54 and the site controller 52 may also be wireless, a dedicated line, a local area network, or the like.

In the preferred embodiment, after the vehicle 10 has identified itself to the site controller 52 through an information dispenser 54, the site controller 52 activates the appropriate information dispenser 54 within the docking station 50 as needed to complete the information transfer. As further described in previously incorporated application Ser. No. 09/483,281, entitled MULTISTAGE FORECOURT DATA ORDER ANT/OR PURCHASE, the information may be dispensed from a plurality of information dispensers 54 as the consumer moves the vehicle 10 about the fueling environment forecourt. To this end, the site controller 52 must keep track of the whereabouts of the vehicle 10 within the docking station 50. This may be accomplished with appropriate transponder technology as was explained in U.S. Pat. No. 5,956,259, previously incorporated by reference. Alternatively, the consumer may be issued a receipt or other indicia that indicates that the consumer has already purchased the information, but still needs to receive the information so purchased. For example, as part of the receipt from a fueling transaction, the consumer could receive a bar code, or be provided an electronic code number that the vehicle onboard computer 12 then transmits as needed to secure an information download. While not preferred, the consumer could swipe a credit card, a smart card, or other payment means at a second information dispenser 54. The account number associated with the payment means would then act as authorization for an information download, even though no additional financial activity took place. Rather the account number is merely an identification mechanism that the docking station 50 could use to make sure that the appropriate person was receiving the information download.

Figure 6:
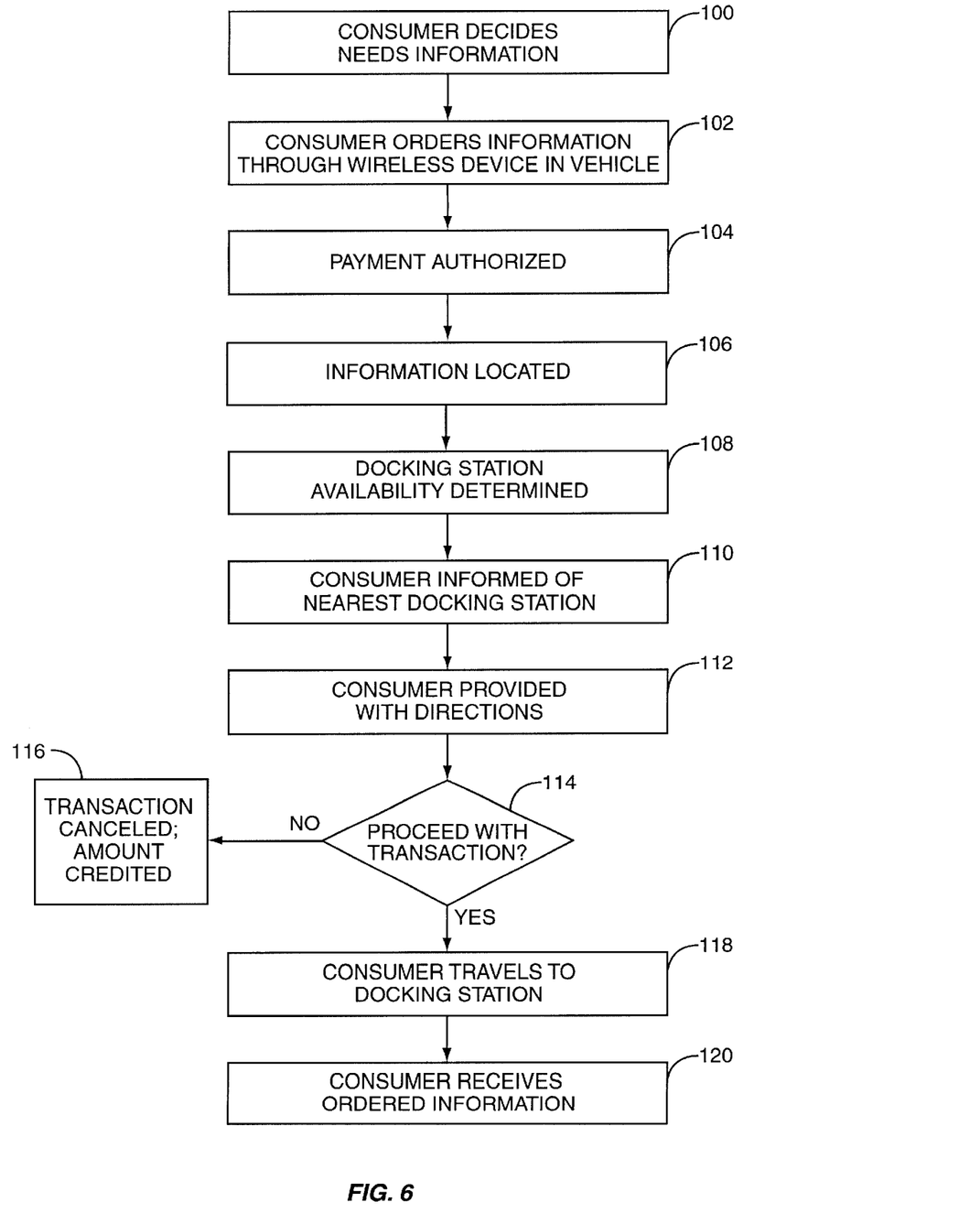
FIG. 6 is a flow chart of the method of the present invention.

With the components of the present invention explicated, the preferred method may now be explained with reference to FIG. 6. Initially, a consumer decides that she needs to access and/or purchase a particular bit of information (block 100). As noted above, this information may be an airline ticket, a hotel reservation, other travel arrangements, travel information, weather information, music, video, movies, software such as games, MP3 or the like equivalents of audio books, or the like as needed or desired by the consumer. As the sources of information continue to proliferate on the World Wide Web, so to will the types of information that consumers desire to purchase proliferate. Thus, information as used herein is meant to be construed broadly. The consumer then orders the desired information through a wireless device in the vehicle 10 (block 102). This may be the onboard computer 12 or other comparable device, and may be done over wireless network 30.

Typically, it will be inefficient to use the network 30 to deliver the purchased information because of bandwidth concerns, thus the information will not be delivered thereby. However, payment authorization may be done through the network 30 (block 104). Payment authorization may be prepaid and debited from the account, by a credit card account or the like as needed or desired. That is, as part of the information purchase request, the wireless device, such as the onboard computer 12, communicates payment account information, such as a credit card number. Appropriate communications take place to secure payment as is well understood in the art.

Meanwhile, the network computer 38 proceeds to locate the purchased information on the remote information providing computers 40 (block 106). Additionally, the network host computer 38 may act as the "intelligence" of the transaction and work to accept the information order, secure payment authorization and the like, or the network host computer 38 can act as a conduit to an e-commerce provider or the like as needed or desired. The remote information providing computers 40 will have a list of authorized docking stations 50 at which the consumer may receive delivery of the purchased information. This may be comparable to a Neighbor List in cellular phone technology. From this list, or comparable information, the decision will be made, either by the network computer 38 or the remote information providing computer 40 which is an appropriate docking station 50 and where it is located (block 108). Alternately, a list of a few alternate docking stations 50 may be provided, with the consumer selecting the desired location either through a prompted response or by showing up at one of the indicated docking stations 50. It may be desirable from a vendor point of view to provide the docking station information only after payment is secured. The onboard computer 12 may additionally send positional location such as is provided by a Global Positioning System (GPS) 29. From this information, the computer deciding which docking station 50 is appropriate may make a more informed decision. Additionally, consumer preferences may be indicated and taken into account in deciding what docking station 50 the consumer is informed of (block 110). For example, the consumer may have indicated a preference for a certain brand of docking station 50, such as BP®, SHELL®, or EXXON®. Such consumer preferences may also take the form of certain types of docking stations 50. For example, the consumer may prefer to receive information from a docking station 50 that is compatible with a particular type of network 30 or that the consumer already has an established account with. In the preferred embodiment, such preference predefined by the consumer are stored in the onboard computer 12 and transmitted by the transmitter 18 during a purchase before the network 30 sends back the particular docking station 50 for the consumer to retrieve purchased information. In an alternative embodiment, the preferences may be entered into the onboard computer 12 by the consumer at the time of purchase either at the consumer's own initiative or by query from the network 30 if such feature is provided by the network 30.

As part of informing the consumer of the nearest appropriate docking station 50 (block 110), the consumer may additionally be provided with directions thereto (block 112). Many GPSs are integrating maps and directional aids that would be useful for this purpose. The consumer must then decide whether to proceed with the transaction (block 114). If the answer is no, then the transaction may be canceled, and the consumer receive a refund to her payment account (block 116). This may occur when the docking station is substantially out of the intended travel path of the consumer, or in a location to which the consumer does not with to travel.

However, if the consumer decides to consummate the transaction, the consumer may then travel to the indicated docking station 50 (block 118). It is possible that payment accounting could be done at this point rather than prior to providing directions to the docking station 50. In this manner, the information purchase could potentially be integrated into another transaction or more conveniently performed without the risk of a credit card number being compromised over a cellular network or the like. At the docking station the consumer may approach an information dispenser 54, such as a fuel dispenser 58 and download the information to the onboard computer 2 (block 120). This may be done wirelessly as previously discussed, the consumer could pick up a portable storage medium such as a disk with the information contained thereon, or the consumer could provide a portable storage device or portable playback device. In the event that the information dispenser 54 provides a disk, the disk would have been purposefully prepared with the customized ordered information in the time it took for the consumer to travel to the, docking station 50. The consumer could place the disk into the disk drive 26 and proceed about her merry way.

While it is assumed that the consumer proceeds with some degree of haste to the docking station 50, there is no absolute requirement that this be done. The consumer may leisurely arrive the next day at the designated docking station 50 and retrieve the information is so desired. However, to prevent excessive demands on the memory at the docking station 50, there may be a time limit imposed on the consumer to retrieve the information. Thus, for example, the information may be deleted after six hours regardless of whether the information has been retrieved.

Also there are permutations on the technique used to select an appropriate docking station 50. The docking station 50 may be selected by the type of information ordered. That is, only certain docking stations 50 can provide the type of information ordered, so the consumer is directed to only those sorts of docking stations 50. Alternatively, if any docking station 50 can provide the consumer with the ordered information, then the closest docking station 50 may be indicated. Still further, docking stations 50 may form alliances similar to ATMs, and have brand names like HONOR®, PLUS®, CIRRUS®, MAC®, PULSE®, AFFN®, or the like. The consumer may only be able to use a subset of the total number of docking stations 50, and thus the directions provided are to one of the approved docking station 50. Yet further, the consumer may indicate a preference for a particular type of docking station 50. For example, if the consumer owns BP® stock and wishes to patronize BP® docking stations 50, the directions may indicate the closest BP® docking station 50, even though that is not the closest available docking station 50.

Figure 7:
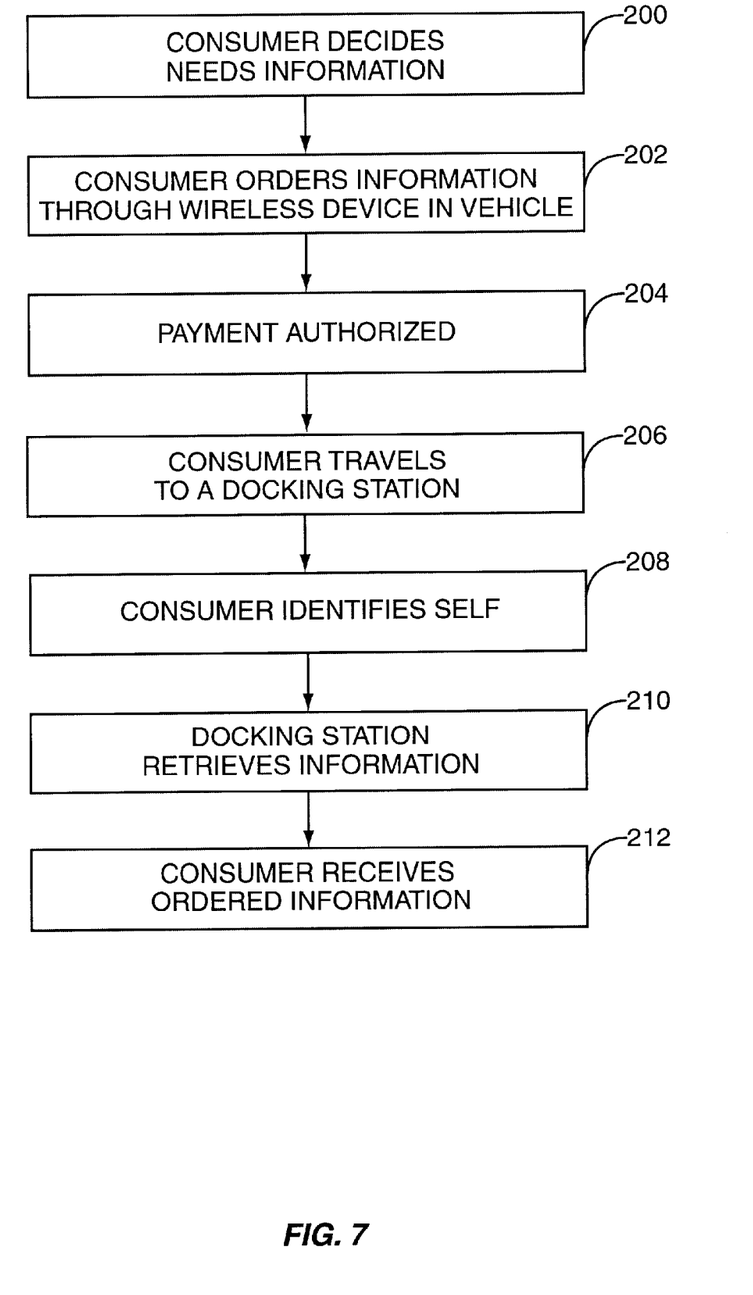
FIG. 7 is a flow chart of an alternate embodiment of the method of the present invention.

An alternate methodology is presented in FIG. 7. In contrast to the method of FIG. 6, wherein the consumer was alerted to potential docking stations 50, the consumer in the alternate methodology arrives at a docking station 50, informs the docking station of her arrival, and then proceeds to download the purchased information. Turning now to FIG. 7, the consumer decides that she needs information (block 200). The consumer orders the information through a wireless device within the vehicle 10, such as the onboard computer 12 (block 202). This is done over the wireless network 30. As discussed above, some computer authorizes payment (block 204) and secures the desired information.

Meanwhile the consumer travels to a docking station 50 (block 206). This may be the next encountered docking station 50, or the closest one with which the consumer is familiar or the like. In contrast to the previous methodology, the consumer arrives at the docking station 50 without prompting by the information provider. At the docking station 50, the consumer identifies herself as the purchaser of the information (block 208). This may be done with a "handshake" or other appropriate identifying information. The identifying information may be provided by the remote information providing computers 40 or other computer as needed. The identifying information may be provided to the information dispenser 54 or to the site controller 52 or the like as needed or desired, but the docking station 50 then retrieves the information over a high speed communications link (block 210) such as a T-1 or T-3 line. The consumer then receives the ordered information (block 214) in any of the aforedescribed techniques or their equivalents.

It should be appreciated that this alternate methodology results in some delay before the information may transferred to the consumer, however, this may be undetectable if an appropriate high speed communications link is in place. This allows the consumer to select a desired docking station, such as one they are previously familiar with, and arrive at their convenience rather than at the instruction of a third party or computer.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A computer implemented method for selling information, comprising:

accepting an electronic order for information from a consumer through an onboard device in a vehicle, when said vehicle is in a first location and in the process of traveling to a destination;

receiving payment for the ordered information;

receiving an electronic indication from the consumer relating to a preference relating to docking stations;

informing the consumer of one or more docking stations from which the consumer may retrieve the ordered information, wherein informing comprises providing the consumer with positional information relating to the one or more docking stations that conform to the preference; and electronically delivering the ordered information to the consumer at a docking station in a second location remote from said first location.

2. The method of claim 1 wherein the preference relates to a brand of preferred docking stations.

3. The method of claim 1 wherein informing the consumer of the one or more docking stations comprises informing the consumer of a docking station closest to the consumer and the first location.

4. The method of claim 1 wherein the preference relates to a type of docking station such that the docking station is compatible with communication equipment associated with the consumer.

5. The method of claim 1 further comprising accepting a consumer identifying code at the docking station to ensure that the information is delivered to a proper consumer.

6. The method of claim 1 wherein the step of delivering the information to the consumer is done wirelessly.

7. The method of claim 1 wherein the step of accepting an order for information is achieved through a wireless network.

8. The method of claim 1 further comprising providing directions between the first location and the second location to the consumer.

9. The method of claim 1 further comprising accepting an order cancellation instruction.

10. The method of claim 1 wherein receiving payment comprises receiving payment subsequent to accepting the order.

11. The method of claim 10 wherein receiving payment comprises receiving payment proximate in time to the step of delivering the information.

12. The method of claim 1 further comprising accessing a computer positioned remotely from the first location and the second location and retrieving the information.

13. The method of claim 1 wherein delivering the information comprises downloading the information to an onboard computer.

14. The method of claim 1 wherein prior to delivering, the method further comprises correlating the information to the consumer at the docking station.

15. The method of claim 14 wherein said information is delivered to an in-vehicle onboard device for subsequent manipulation thereby.

16. The method of claim 14 wherein delivering the information comprises delivering the information to an intermediate device.

17. The method of claim 1 wherein the preference relates to a type of network with which the consumer has an established account.

18. The method of claim 1 wherein receiving an indication from the consumer relating to a preference relating to docking stations comprises receiving the indication prior to the consumer placing an order for the information.

19. The method of claim 1 wherein receiving an indication from the consumer relating to a preference relating to docking stations comprises receiving the indication as part of an order for the information.

20. The method of claim 1 wherein providing the consumer with positional information relating to the one or more docking stations that conform to the preference comprises providing the consumer with positional information relating to docking stations in a fueling environment.

21. A system for selling information to a consumer in a moving vehicle, comprising:

means to receive instructions from an onboard device in the consumer's moving vehicle requesting the purchase of information when the comsumer's moving vehicle is in a first location;

means for receiving an indication from the consumer relating to a preference relating to docking stations;

means for informing the consumer of one or more docking stations from which the consumer may retrieve purchased information, wherein informing comprises providing the consumer with positional information relating to the one or more docking stations that conform to the preference;

means for delivering directions to the one or more docking stations for the consumer's use; and     means for delivering the purchased information to the consumer at a docking station in a second location remote from said first location.

22. A system for selling information, comprising:

a wireless network with a control system, said control system adapted to:

accept an order for information from a consumer through an onboard device in a vehicle, when said vehicle is in a first location and in the process of traveling to a destination;

receive payment for the ordered information;

receive an indication from the consumer relating to a preference relating to docking stations;

inform the consumer of one or more docking stations from which the consumer may retrieve the ordered information, wherein informing comprises providing the consumer with positional information relating to the one or more docking stations that conform to the preference; and         deliver the ordered information to the consumer at a docking station in a second location remote from said first location.

\* \* \* \* \*